United States Patent
Chou et al.

(10) Patent No.: US 8,410,632 B2
(45) Date of Patent: Apr. 2, 2013

(54) POWER ADAPTER HAVING MULTI-DC POWER CONNECTORS

(75) Inventors: Yi-Chang Chou, Taipei (TW); Chuan-Hsing Wu, Taipei (TW); Grant Chen, Taipei (TW); Ming-Yi Lin, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 293 days.

(21) Appl. No.: 12/958,563

(22) Filed: Dec. 2, 2010

(65) Prior Publication Data

US 2012/0139511 A1    Jun. 7, 2012

(51) Int. Cl.
*H02J 3/00*    (2006.01)
(52) U.S. Cl. ............................................. 307/17; 307/15
(58) Field of Classification Search .................. 363/146; 307/17, 11, 31, 15
See application file for complete search history.

(56) References Cited

U.S. PATENT DOCUMENTS 5,347,211 A    9/1994    Jakubowski
5,412,253 A *  5/1995    Hough ............................ 307/17

* cited by examiner

*Primary Examiner* — Shawn Riley
(74) *Attorney, Agent, or Firm* — C. G. Mersereau; Nikolai & Mersereau, P.A.

(57) ABSTRACT

The present invention discloses a power adapter has a power converter, a power output cable, a first DC power connector and multiple second DC power connectors. The power converter has a casing, a power converting circuit mounted in the casing, and an AC power inlet and DC power outlet electronically connected to the power converting circuit. The power output cable has a DC output and selective connector having two DC power pinholes and multiple selective pinholes surrounding the two DC power pinholes. The first DC power connector has two DC voltage pins and is selectively connected to the DC output and selective connector. Each of the second DC power connectors has a body, a DC plug formed on the body, two DC voltage pins formed on the body and one jumper pin formed on the body and corresponding to the selective pinholes of the power output cable to change voltage of the DC power output from the power converting circuit.

8 Claims, 13 Drawing Sheets

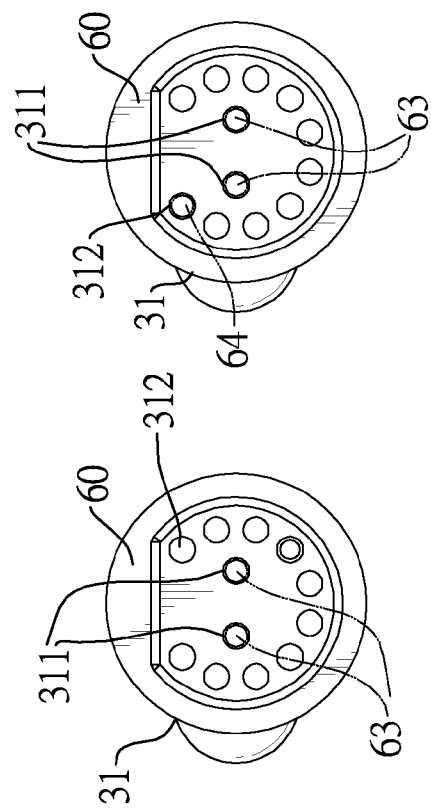

POWER ADAPTER HAVING MULTI-DC POWER CONNECTORS

BACKGROUND OF THE INVENTION

1. Field of the Invention

The present invention relates to the field of a power adapter, and more particularly to a power adapter having multi-DC power connectors.

2. Description of Related Art

Electronic devices provide various functions to improve human life. However, there are many most of electronic devices operating at many different voltages and require different power adapters. Therefore, when the user buys a new electronic device, the user also obtains at least one power adapter for the new electronic device.

Some one proposed different solutions for this issue, such as one US patent (U.S. Pat. No. 5,347,211 B) discloses that a selectable output power converter. With reference to FIG. 6 of the US patent, the selectable output power converter for providing a selectable desired voltage has a converter circuit having an input port for receiving an input of a first voltage and an output port for providing an output of a second voltage. The converter circuit also has a keyway for receiving a key 30. The key 30, which is configured to be received by the keyway, contains an electrical component 38 and has a body within which the electrical component 38 is disposed. The output voltage of the converter is determined by the value of the component 38 disposed within the body of the key 30 such that the output voltage can be varied by replacing the key 30 with another key 30 having an electrical component 38 of a different value.

The power converter of the US patent can adjust output voltage by using different keys. However, most of the electric devices operating at many different voltages require unique DC plug of a power cable of the power converter. Therefore, the power converter of the US patent has to prepare many power cable to connected to the output jack 16 shown in FIG. 1 of the US patent.

To overcome the shortcomings, the present invention provides a power adapter having multi-DC power connectors to mitigate or obviate the aforementioned problems.

SUMMARY OF THE INVENTION

The main objective of the present invention is to provide a power adapter having multi-DC connectors to provide a specific DC power according to different DC connector.

The power adapter has a power converter, a power output cable, a first DC power connector and multiple second DC power connectors. The power converter has a casing, a power converting circuit mounted in the casing, an AC power inlet mounted through one side of the casing and electronically connected to the power converting circuit, and a DC power outlet mounted through another side of the casing and electronically connected to the power converting circuit. The power output cable has a first end electronically connected to the DC power outlet of the power converter and a second end having a DC output and selective connector. The DC output and selective connector has two DC power pinholes and multiple selective pinholes surrounding the two DC power pinholes. The first DC power connector has two DC voltage pins and is selectively connected to the DC output and selective connector. Each of the second DC power connectors is selectively connected to the DC output and selective connector and has a body, a DC plug formed on the body, two DC voltage pins formed on the body and one jumper pin formed on the body and corresponding to the selective pinholes of the power output cable to change voltage of the DC power output from the power converting circuit.

Other objectives, advantages and novel features of the invention will become more apparent from the following detailed description when taken in conjunction with the accompanying drawings.

BRIEF DESCRIPTION OF THE DRAWINGS

FIGS. 4A to 4D are cross sectional views of the power cable with different DC power connectors.

DETAILED DESCRIPTION OF THE PREFERRED EMBODIMENT

Figure 1:
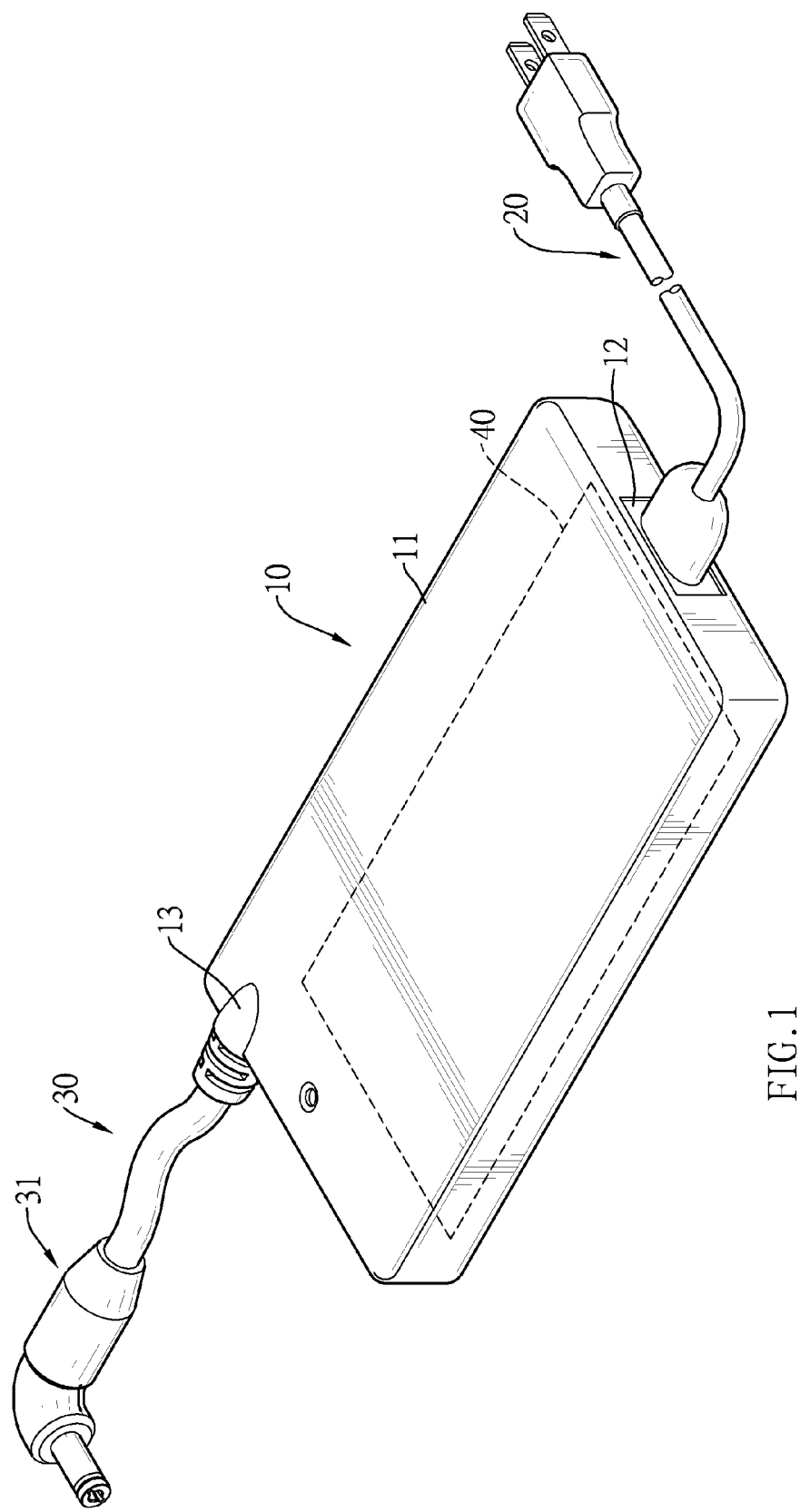
FIG. 1 is a perspective view of a power adapter in accordance with the present invention.
Figure 2:
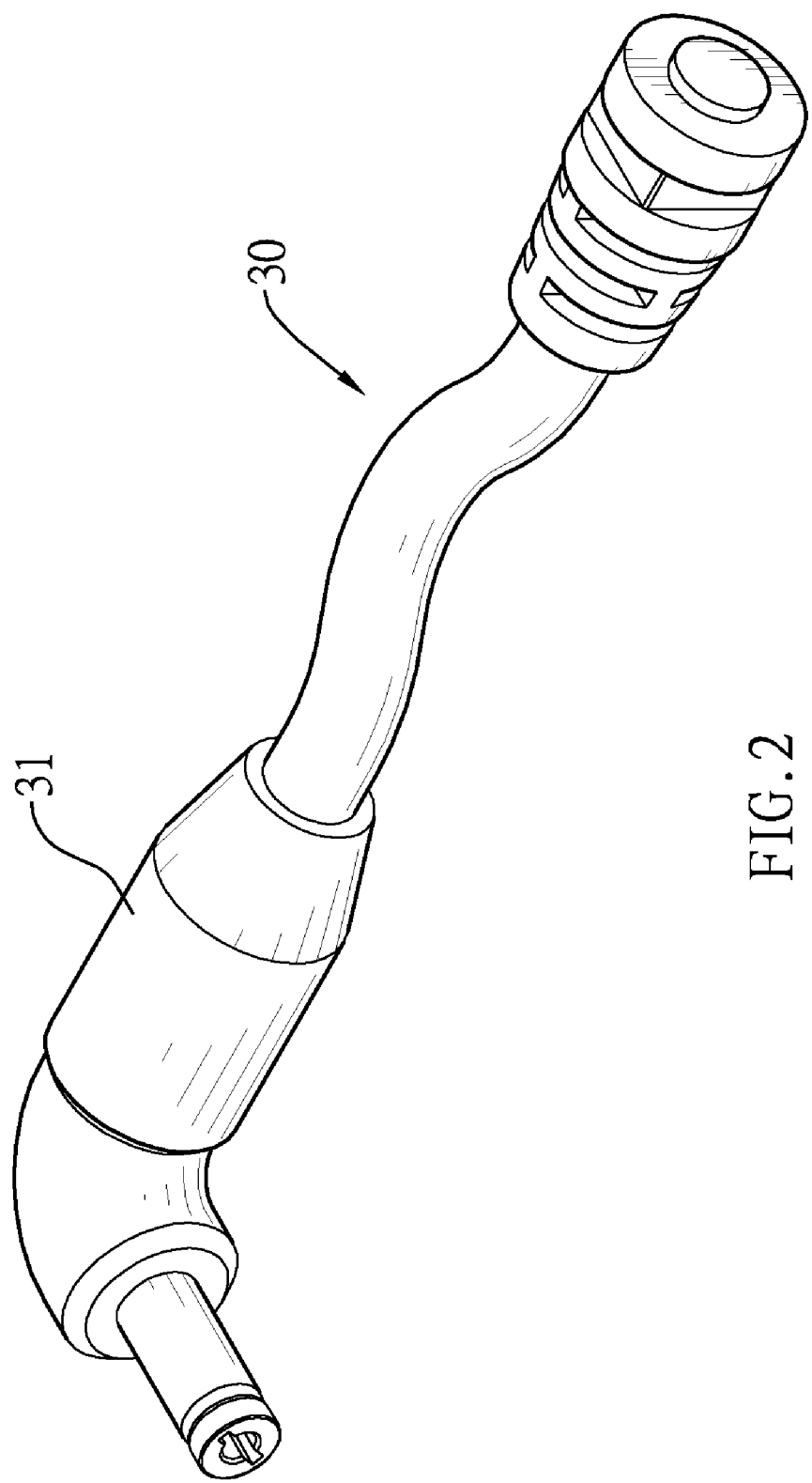
FIG. 2 is a perspective view of a power cable with a DC power connector of the power adapter in accordance with the present invention.
Figure 3A:
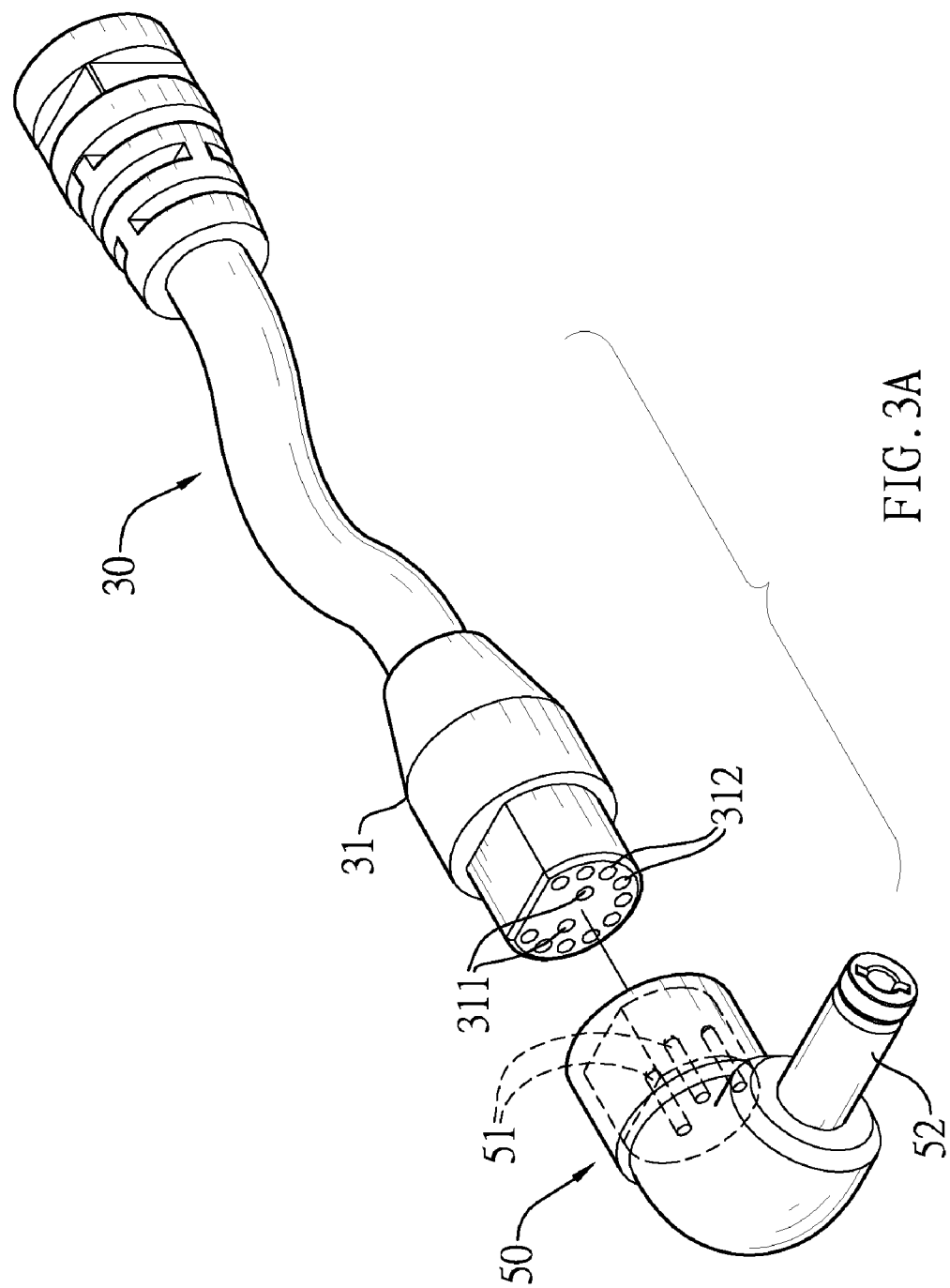
FIG. 3A is a perspective view of the power cable and a DC power of the power adapter in accordance with the present invention.
Figure 3B:
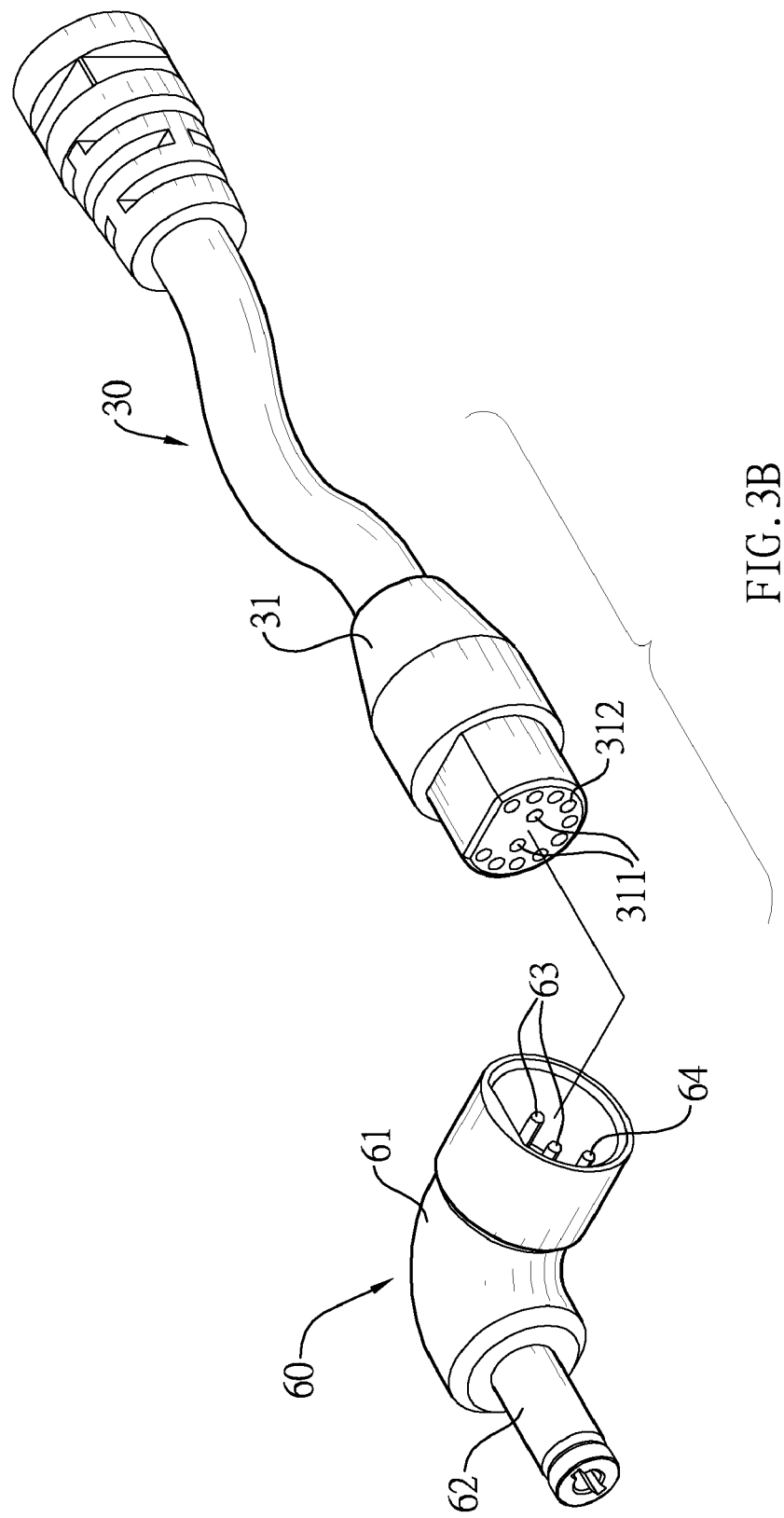
FIG. 3B is a perspective view of the power cable and another DC power of the power adapter in accordance with the present invention.
Figure 5A:
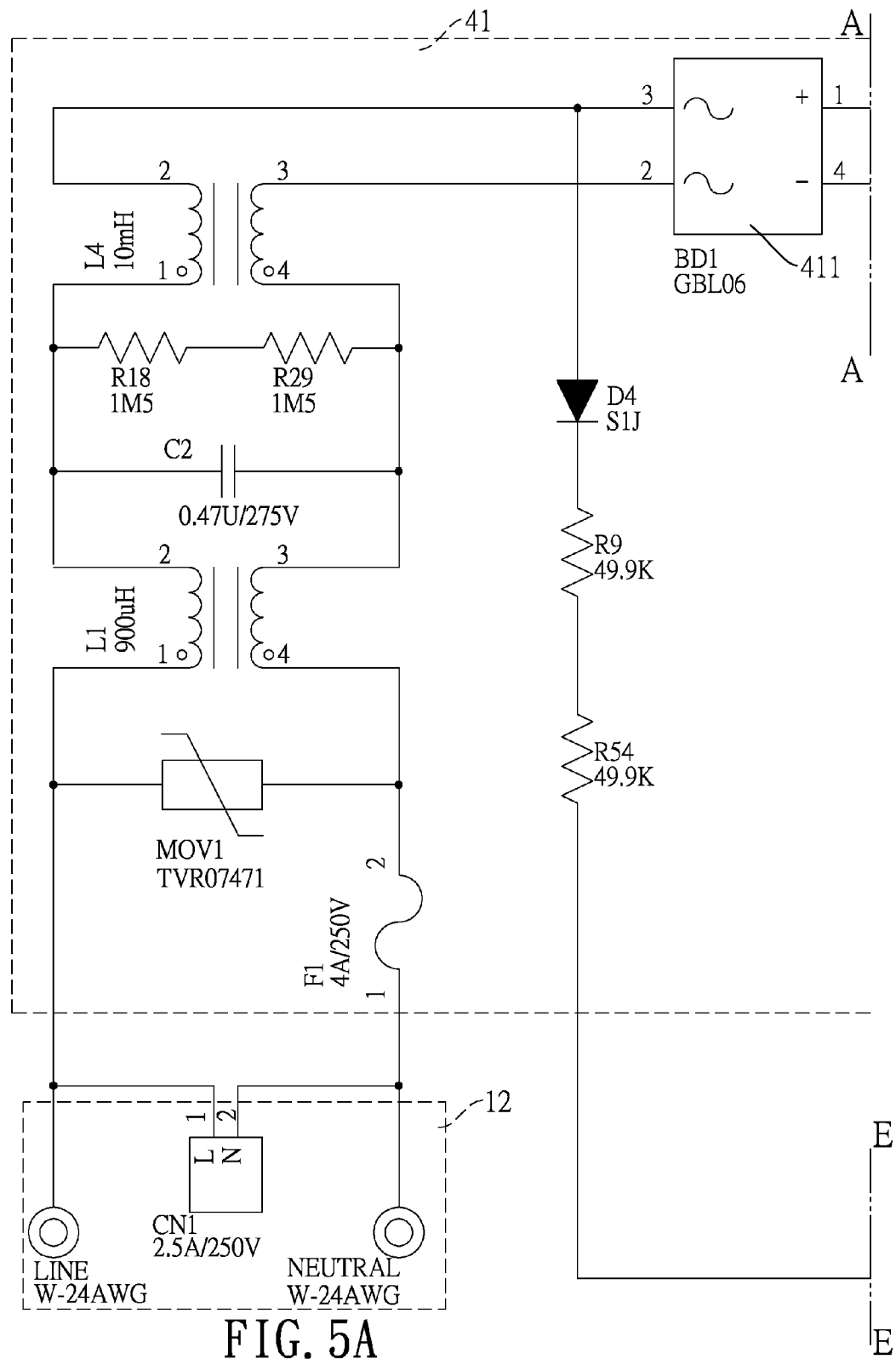
FIGS. 5A to 5H are detailed circuit diagrams of the power adapter in accordance with the present invention.
Figure 5B:
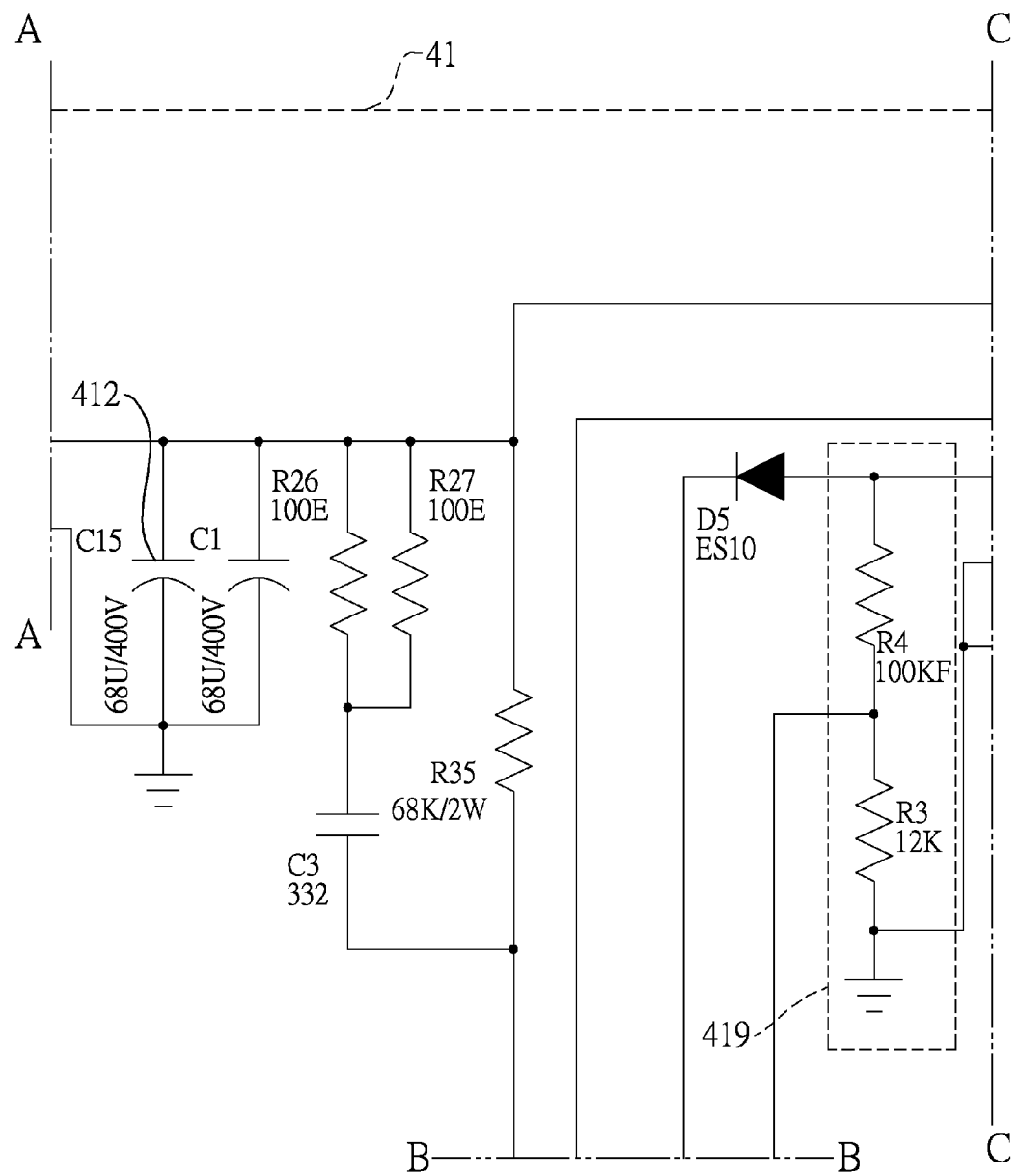
Figure 5C:
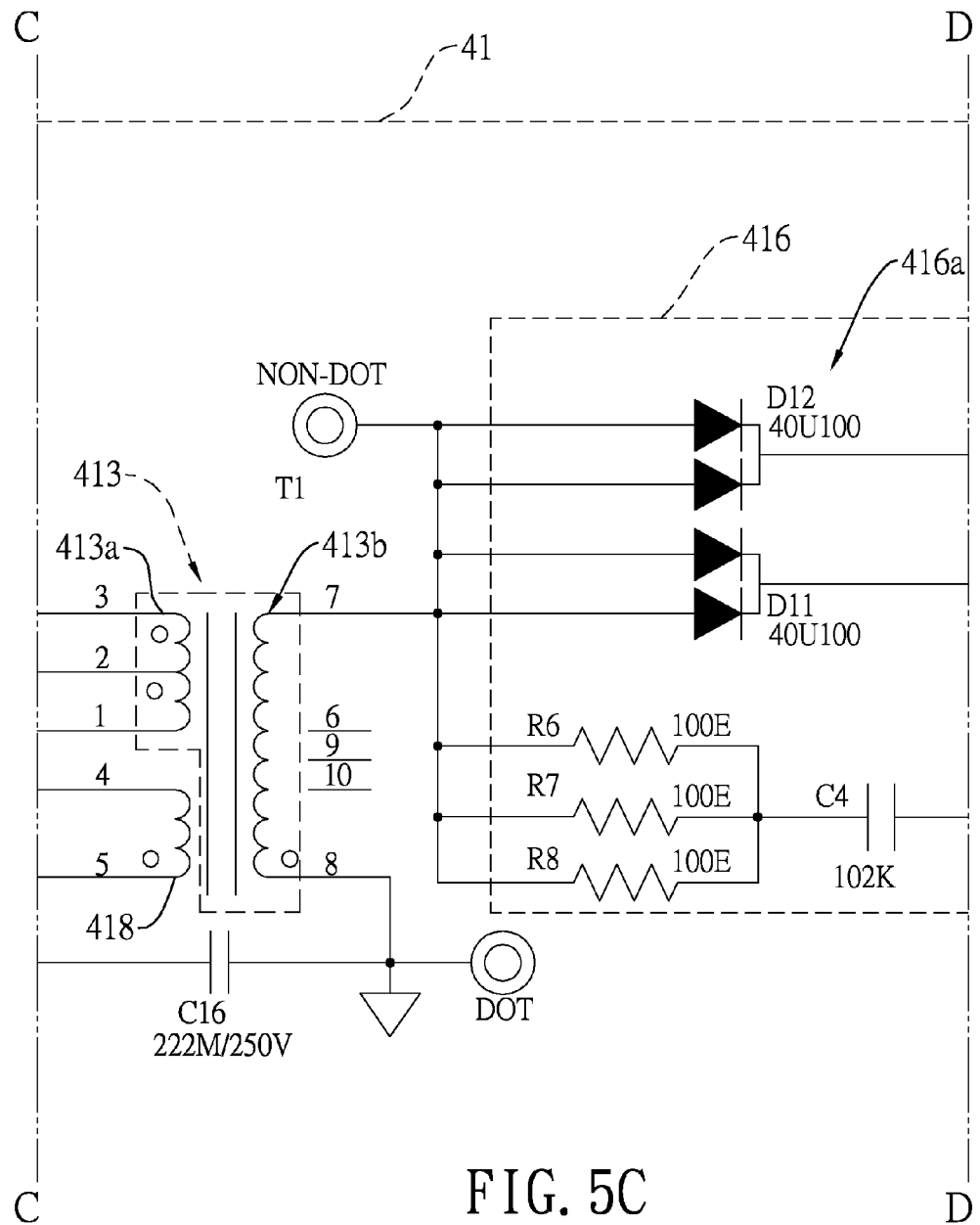
Figure 5D:
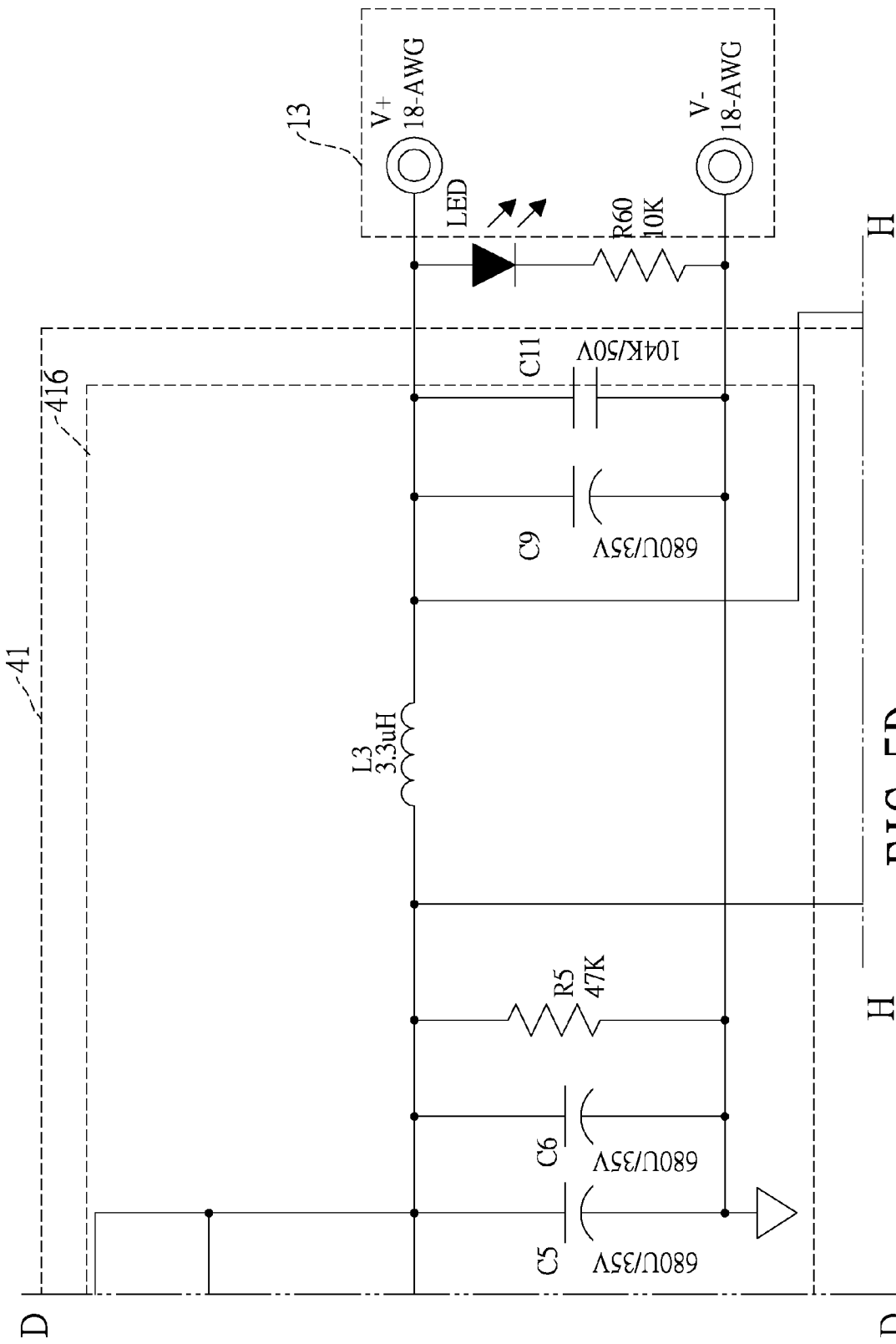
Figure 5E:
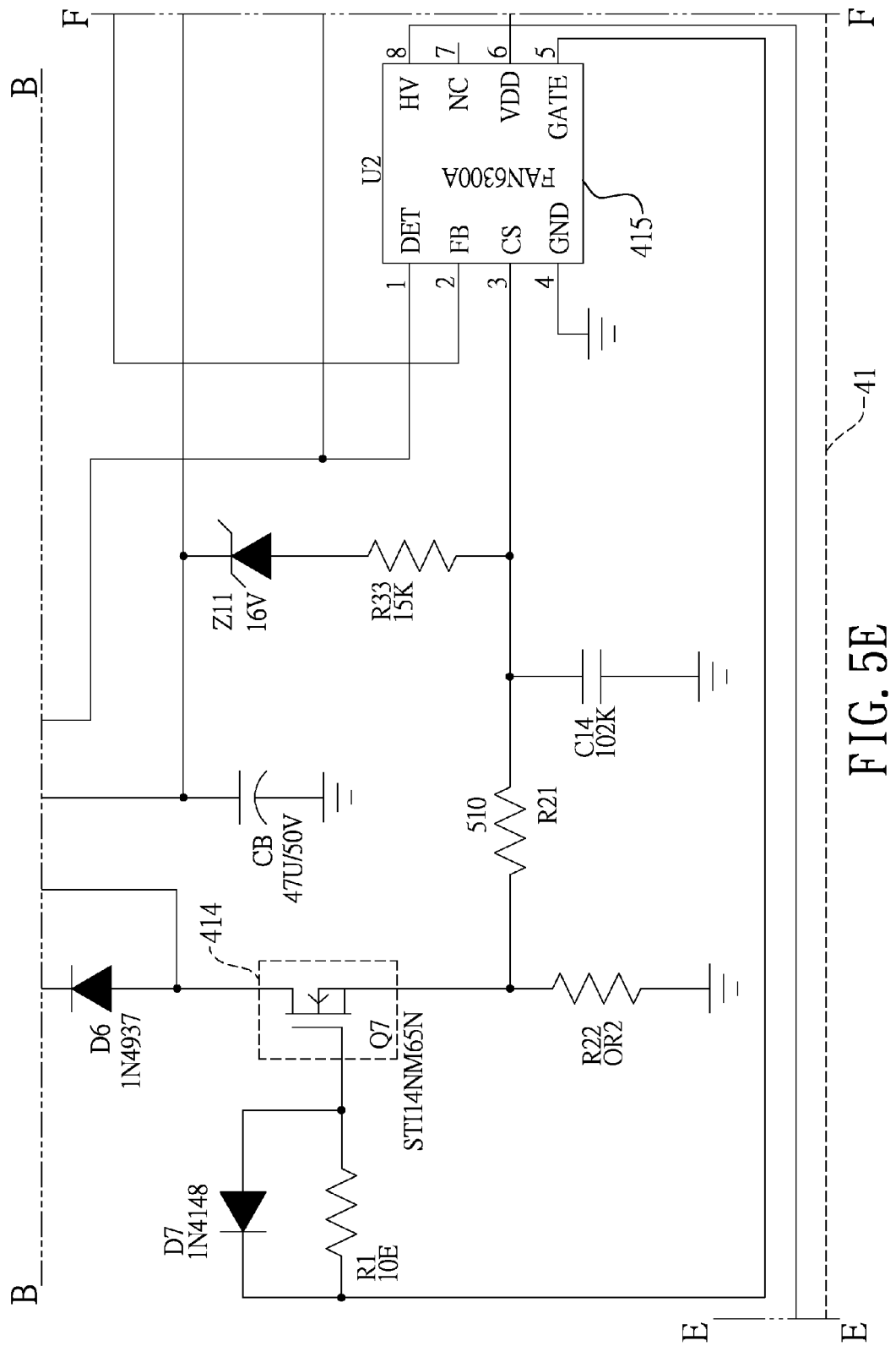
Figure 5F:
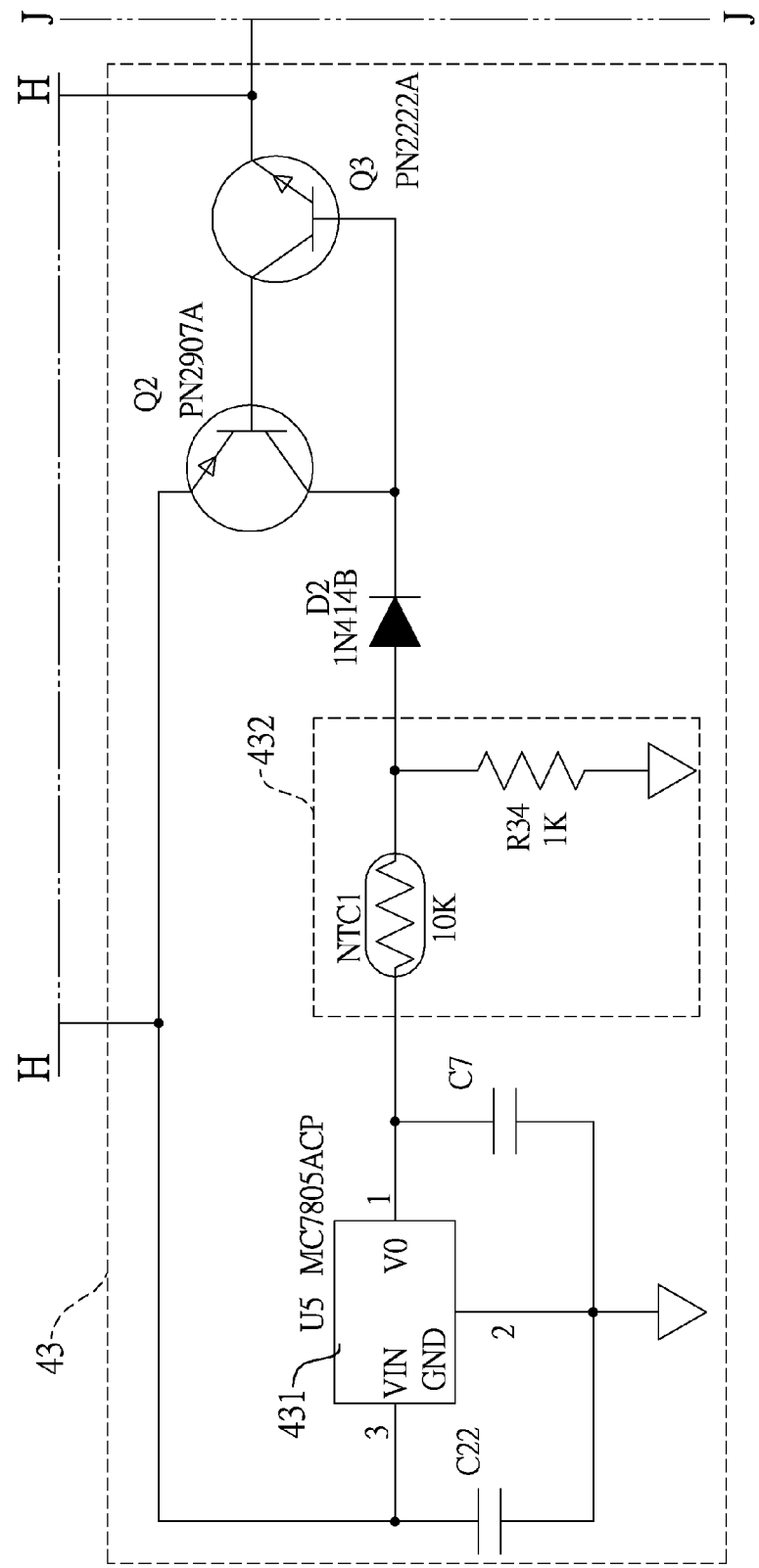
Figure 5G:
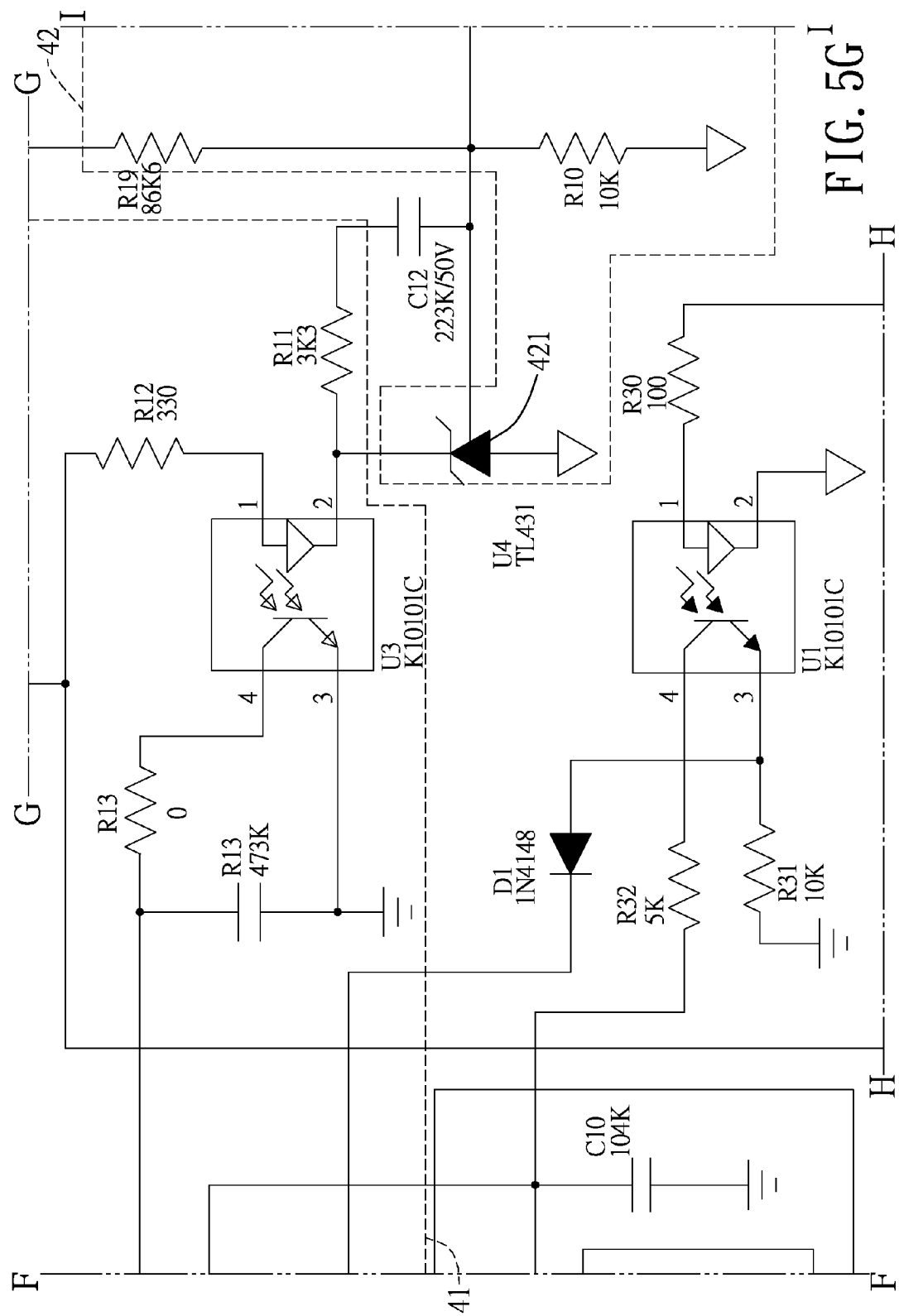
Figure 5H:
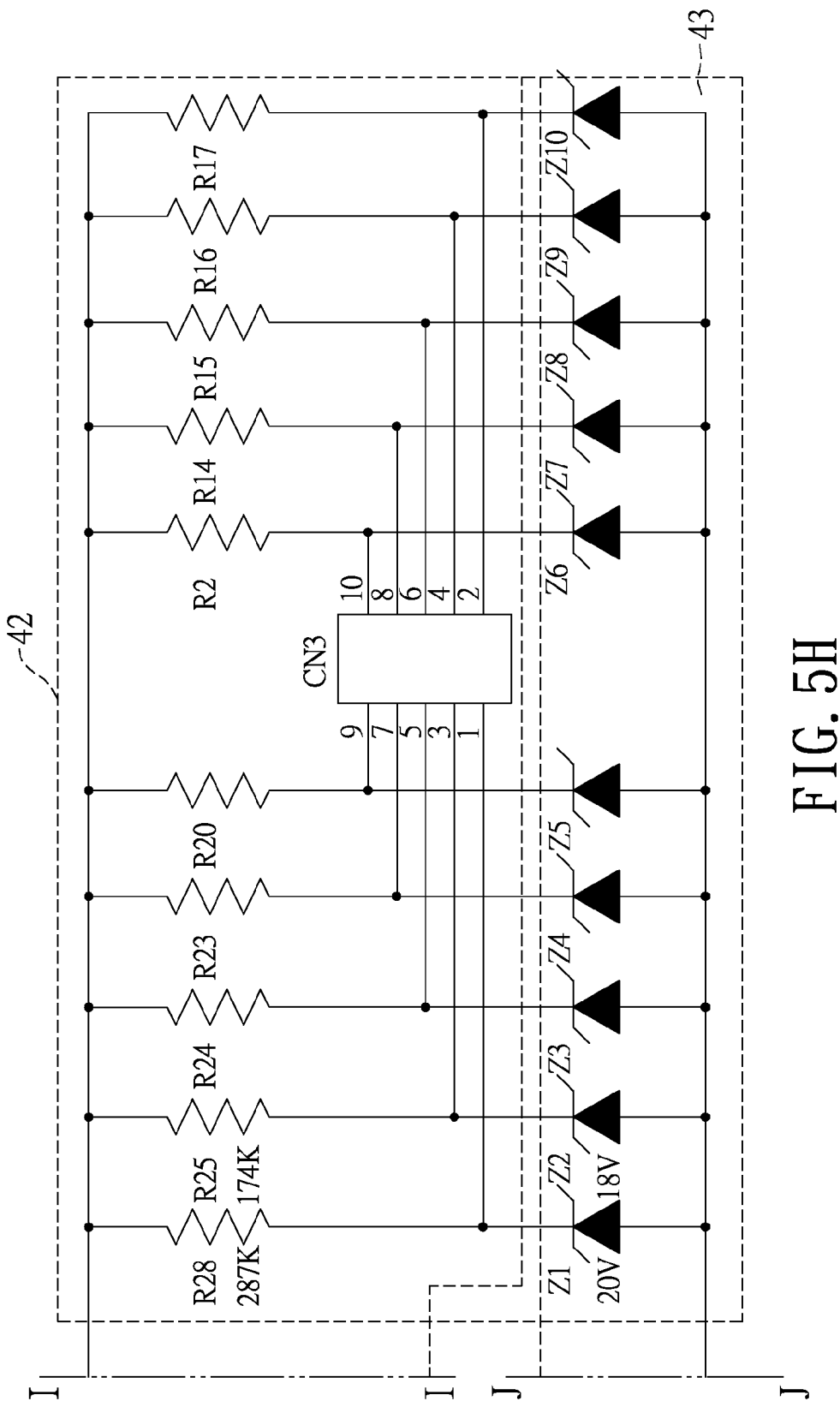

With reference to FIGS. 1 and 3A and 3B, a power adapter has a power converter 10, a power input cable 20, a power output cable 30, a first DC power connector 50 and multiple second DC power connectors 60.

The power converter has a casing 11, a power converting circuit 40 mounted in the casing 11, an AC power inlet 12 mounted through one side of the casing 11, a DC power outlet 13 mounted through another side of the casing 11. The power converting circuit 40 is electronically connected to the AC power inlet 12 and DC power outlet 13.

The power input cable 20 is electronically connected to the AC power inlet 12 to provide AC power to the power converting circuit 40.

The power output cable 30 has a first end and a second end. The first end is electronically connected to the DC power outlet 13 of the power converter 10. The second end has a DC output and selective connector 31 having two DC power pinholes 311 and multiple selective pinholes 312. The selective pinholes 311 surround the two DC power pinholes 312.

The first DC power connector 50 has two DC voltage pins 51 and a DC plug 52 and is selectively connected to the DC output and selective connector 31. Each of the second DC power connectors 60 is selectively connected to the DC output and selective connector 31 and has a body 61, a DC plug 62, two DC voltage pins and one jumper pin 64. The jumper pins 64 of the second DC power connectors 50 are corresponding to the selective pinholes 312 of the power output cable 30. In the present invention, the power output cable 30 has ten selective pinholes 312. When the first DC power connecter 50 is connected to the DC output and selective connector 31, the DC voltage pins 51 are inserted into the DC power pinholes 311 of the second DC output and selective connector 31. When the second DC power connecter 60 is connected to the DC output and selective connector 31, the DC voltage pins 63 are inserted into the DC power pinholes 311 of the second DC output and selective connector 31 and the jumper pin 64 is inserted to the corresponding selective pinhole 312 of the DC output and selective connector 31 as shown in FIGS. 4A to 4D. The DC plug 52, 62 outputs the DC power from the DC voltage pins 51, 61.

With further reference to FIGS. 5A to 5H, a preferred embodiment of a detailed circuit of the power converting circuit 40 is shown. The power converting circuit 40 has a switching power converting unit 41, an adjustable reference voltage unit 42 and an overheat protection unit 43. The power converting circuit 40 is a flyback power converter and has a rectifier 411, a storage capacitor 412, a transformer 413, a power switch 414, a PWM controller 415, a secondary side unit 416 and an output voltage feedback unit 417.

The rectifier 411 is electronically connected to the AC power inlet 12 and the storage capacitor 412 is electronically between the filter 411 and a primary side 413a of the transformer 413. The secondary side unit 416 is electronically connected to a secondary side 413b of the transformer 413 to output stable DC power. The power switch 414 is electronically connected to the primary side 413a of the transformer 413 in serial.

The PWM controller 415 has a PWM output terminal GATE, a voltage sensing voltage terminal DET, a current sensing terminal CS, a power terminal VDD and a feedback terminal FB. The PWM output terminal GATE is electronically connected to a controlling terminal of the power switch 414 to adjust a duty cycle of the power switch 414. The voltage sensing terminal DET is electronically connected to a coil 418 through a first voltage divider 419. The coil 418 inducts current changes of the primary side 413a of the transformer 413 and the first voltage divider 419 outputs corresponding voltage changes to the PWM controller 415, so the PWM controller 415 detects the voltage changes of the primary side 413a of the transformer 413. The current sensing terminal CS is electronically connected to a resistor R22 connected to the power switch 414 in serial to directly sense the current changes of the primary side 413a of the transformer 413. The power terminal VDD is connected to the coil 418 through the diode D5 to obtain a stable voltage. The feedback terminal FB is connected to output of the output voltage feedback unit 417.

The secondary side unit 416 is connected to the secondary side 413b of the transformer 413 and has a rectifying and filtering unit 416a, an inductor L3 and at least one output capacitor C9, C11. The inductor L3 is connected between the rectifying and filtering unit 416a and the at least one output capacitor C9, C11. Two ends of the output capacitor C9, C11 are connected to the DC power outlet 13 to provide the DC power.

The output voltage feedback unit 417 has a first photo coupler U3 having an LED and a photo-transistor. The phototransistor is connected to the feedback terminal FB of the PWM controller 415. The LED is serially connected to a connecting node of the rectifying and filtering unit 416a and the inductor L3 and ground.

Further, the adjustable reference voltage unit 41 is connected to the LED of the photo coupler U3 and has a three-terminal adjustable regulator 421, a second voltage divider R19, R10, multiple resistors R28, R25, R24, R23, R20, R2, R14, R15, R16, R17 and a jumper connector 422.

The adjustable regulator 421 has an anode terminal, a cathode terminal and a reference terminal. The anode terminal and the cathode terminal are respectively connected to the LED of the photo coupler U3 and the ground of the DC power from the secondary side unit 416. The reference terminal is connected to a serial node of the second voltage divider R19, R10. One end of each resistor R28, R25, R24, R23, R20, R2, R14, R15, R16, R17 is connected to the serial node of the second voltage divider R19, R10 and the other end thereof is connected to corresponding jumper terminal of the jumper connector 422. The jumper connector 422 is connected to a connecting node of the inductor L3 and the output capacitor C9, C11. In preferred embodiment, the jumper connector 422 has ten jumper terminals corresponding to the ten selective pinholes 312 of ii the DC output and selective connector 31. When the jumper pin 64 of the DC power connector 60 is inserted to the corresponding pinhole 312 of the DC output and selective connector 31, the jumper terminal of the jumper connector 422 is electronically connected to the connecting node between the inductor L3 and the output capacitor C9, C11. Therefore, the resistor R28 connected to the corresponding jumper terminal is parallelly connected to an upper resistor R19 to change the voltage of the reference voltage terminal. Since the voltage of the reference terminal of the adjustable regulator 421 is changed, the conductive current of the photo-transistor of the photo coupler U3 is changed and the PWM controller 415 reduce the duty cycle of the power switch 414 to reduce the current of the primary side 413a of the transformer 413. Therefore, the secondary side unit 413b outputs a different voltage of the DC power source according to the DC connector 31 connected to the DC power cable 30.

For example, when the first DC power connector 50 without the jumper pin 64 is connected to the DC power output and selective connector, none of the resistors R28, R25, R24, R23, R20, R2, R14, R15, R16, R17 is parallelly connected to the upper resistor R19 of the second voltage divider R19, R10 through the jumper connector 422 so the voltage of the reference terminal will be 2.5V. That is, the secondary side unit 413b outputs preset voltage (24V) of the DC power.

When the user would like to use the 19V DC power, he or she selects the corresponding second DC power connector 60 to connect the DC power cable 30. If the resistor R28 (287K) connected to the first jumper terminal of the jumper connector 422 matches the 19 DCV, one of the second DC power connectors 60 with the jumper pin 64 corresponding to the first selective pinhole 612 is connected to the DC power cable 30. The resistor R28 corresponding to the first jumper terminal is parallelly connected to the upper resistor R19 of the second voltage divider R19, R10, so the reference terminal of the adjustable regulator 421 is increased and about 3V. Therefore, the photo coupler U3 response the voltage changes to the PWM controller 415. The PWM controller 415 further reduces the duty cycle of the power switch 414, so the current of the primary side 413a of the transformer 413 is decreased. The secondary side unit 416 outputs the DC power with 19V.

In addition, multiple zener diodes Z1, Z2, Z3, Z4, Z5, Z6, Z7, Z8, Z9, Z10 with different breakdown voltages are respectively connected to the resistors R28, R25, R24, R23, R20, R2, R14, R15, R16, R17 of the adjustable reference voltage unit 42 in serial and the LED of the second photo coupler U1. If the zener diode Z1 breaks down, the breakdown voltage of the zener diode Z1 triggers the LED of the second photo coupler U1 to be over voltage protection.

Based on the foregoing description, different second DC power connector 60 is connected to the DC power cable 30, the power adapter 10 outputs the corresponding DC power. Therefore, the user just selects a suitable first or second DC power connector 50, 60 to change the DC power of the power adapter. Therefore, the power adapter in accordance with the present invention provides different DC power for different electronic devices.

The overheat protection unit 43 has a voltage regulator 431, a third voltage divider 432 consisted of an upper thermal resistor NTC1 and a lower resistor R34, a first transistor Q2, a second transistor Q3, and a second photo coupler U1.

The voltage regulator 431 has a DC input and a DC output. The DC input is connected to the connecting node of the inductor L3 and the rectifying and filtering unit 416a and output a fixed DC power to the DC output.

One end of the upper thermal resistor NTC1 is connected to the DC output and the other end is a connecting node of the upper thermal NTC1 and the lower resistor R34. The other end of the lower resistor R34 is connected to the ground. In the preferred embodiment, the upper thermal resistor NTC1 is a NTC type. When the thermal inside the casing 11 is gradually increased, the resistance of the thermal resistor NTC1 is gradually reduced, so the divided voltage of the third voltage divider 432 at the connecting node is gradually increased.

The first transistor Q2 is a PNP type and the second transistor Q3 is NPN type. The emitter of the first transistor Q2 is connected to the DC input and the collector is connected to the connecting node of the third voltage divider 432 through a diode D2. The cathode is connected to the collector of the first transistor Q2. The base of the first transistor Q1 is connected to the collector of the second transistor Q3. The emitter is connected to an anode of the LED D2 of the second photo coupler U1 and the anodes of the zener diodes Z1, Z2, Z3, Z4, Z5, Z6, Z7, Z8, Z9, Z10. The cathode of the LED d2 is connected to the ground. A photo-transistor is connected between the power terminal VDD of the PWM controller 415 and ground.

If the thermal inside the casing 11 of the power adapter is normal, the first and second transistors Q2, Q3 are turned off, so the photo-transistor of the second photo coupler U1 is turned off. On the contrary, if the thermal inside the casing is too high, the resistance of the thermal resistor NTC1 is decreased and the divided voltage of the third voltage divider 432 is increased to drive the first and second transistors Q2, Q3 are turned on. At the time, the zener diode Z1 provides a fixed breakdown voltage to the LED of the second photo coupler U1, so the photo-resistor of the second photo coupler U1 is turned on, the power terminal VDD is shorted to ground. Therefore, the PWM controller 415 turns off and the power switch 414 is turned off, too. The secondary side unit 416 does not provide DC power source.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power adapter having multi-DC power connectors, comprising:
    a power converter having:
        a casing;
        a power converting circuit mounted in the casing;
        an AC power inlet mounted through one side of the casing and electronically connected to the power converting circuit; and
        a DC power outlet mounted through another side of the casing and electronically connected to the power converting circuit;
    a power input cable electronically connected to the AC power inlet to provide AC power to the power converting circuit;
    a power output cable having:
        a first end electronically connected to the DC power outlet of the power converter; and
        a second end having a DC output and selective connector having:
            two DC power pinholes; and
            multiple selective pinholes surrounding the two DC power pinholes;
    a first DC power connector having two DC voltage pins and selectively connected to the DC output and selective connector;
    multiple second DC power connectors, each of which selectively connects to the DC output and selective connector and has:
        a body;
        a DC plug formed on the body;
        two DC voltage pins formed on the body; and
        one jumper pin formed on the body and corresponding to the selective pinholes of the power output cable to change voltage of the DC power output from the power converting circuit.

2. The power adapter as claimed in claim 1, wherein the power converting circuit is a switching power converting and comprises:
    a rectifier electronically connected to the AC power inlet;
    a storage capacitor electronically between the filter and a primary side of a transformer;
    a secondary side unit electronically connected to a secondary side of the transformer to output a stable DC power;
    a power switch electronically connected to the primary side of the transformer in serial;
    a PWM controller having:
        a PWM output terminal electronically connected to a controlling terminal of the power switch to adjust a duty cycle of the power switch; and
        a feedback terminal;
    a secondary side unit electronically connected to the secondary side of the transformer to output the DC power to the DC power outlet;
    an output voltage feedback unit having a photo coupler having:
        an LED serially connected to a connecting node of the rectifying and filtering unit and the inductor and ground; and
        a photo-transistor connected to the feedback terminal of the PWM controller; and
    an adjustable reference voltage unit connected to the LED of the photo-transistor of the first photo coupler to change the feedback voltage of the PWM controller so as to change voltage of the DC power from the secondary side unit.

3. The power adapter as claimed in claim 2, wherein the PWM controller further comprises:
    a voltage sensing terminal electronically connected to a coil through a first voltage divider, wherein the coil inducts current changes of the primary side of the transformer and the first voltage divider outputs corresponding voltage changes to the voltage sensing terminal, so the PWM controller detects the voltage changes of the primary side of the transformer;
    a current sensing terminal electronically connected to a resistor connected to the power switch in serial to directly sense the current changes of the primary side of the transformer;
    a power terminal electronically connected to the coil through the diode to obtain a stable voltage.

4. The power adapter as claimed in claim 3, wherein the secondary side unit comprises:
    a rectifying and filtering unit electronically connected to the secondary side of the transformer;

at least one output capacitor electronically connected to the DC power outlet; and an inductor electronically connected between the rectifying and filtering unit and the at least one output capacitor.

5. The power adapter as claimed in claim 4, wherein the adjustable reference voltage unit comprises:

a jumper connector electronically to a connecting node of the inductor and the output capacitor and having jumper terminals matching the selective pinholes of the DC output and selective connectors;

a three-terminal adjustable regulator having an anode terminal, a cathode terminal and a reference terminal, wherein the anode terminal and the cathode terminal are respectively connected to the LED of the first photo coupler and the ground of the DC power from the secondary side unit; and the reference terminal is electronically connected to a serial node of a second voltage divider; and multiple resistors electronically connected between the serial node of the second voltage divider and corresponding jumper terminals of the jumper connector to selectively connected to an upper resistor of the second voltage divider.

6. The power adapter as claimed in claim 5, wherein power converting circuit further comprises an overheat protection unit having:

a second photo coupler having an LED and a photo-resistor;

a voltage regulator having a DC input and a DC output, wherein the DC input electronically connected to the connecting node of the inductor and the rectifying and filtering unit and outputting a fixed DC power to the DC output;

a third voltage divider consisted of an upper thermal resistor and a lower resistor, wherein one end of the upper thermal resistor is connected to the DC output, the other end is a connecting node of the upper thermal resistor and the lower resistor, the other end of the lower resistor is connected to the ground; and a first and second transistors connected between the LED of the second photo coupler, the adjustable reference voltage unit and a serial node of the third voltage divider.

7. The power adapter as claimed in claim 6, further comprising multiple zener diodes with different breakdown voltages respectively connected to the resistors of the adjustable reference voltage unit 42 in serial to be over voltage protection.

8. The power adapter as claimed in claim 7, wherein
the first transistor is a PNP type and has:

an emitter electronically connected to the DC input;

a collector electronically connected to the connecting node of the third voltage divider through a diode, wherein the collector is connected to a cathode of the diode and the and an anode of the diode is connected to the DC output of the voltage regulator; and a base;

the second transistor is a NPN type and has:

an emitter connected to an anode of the LED of the second photo couple and the anodes of the zener diodes;

a collector connected to the base of the first transistor; and a base connected to the collector of the first transistor;

an cathode of the LED of the second photo coupler is connected to the ground and a photo-transistor is connected between the power terminal of the PWM controller and ground.

\* \* \* \* \*